May 31, 1932.　　　A. I. MARCUM　　　1,860,470
ROAD VEHICLE SPRING SUSPENSION
Original Filed Aug. 4, 1923　　3 Sheets-Sheet 1

WITNESS:
H. Sherburne

INVENTOR
A. I. Marcum
BY White Prost Shaw
his ATTORNEYS

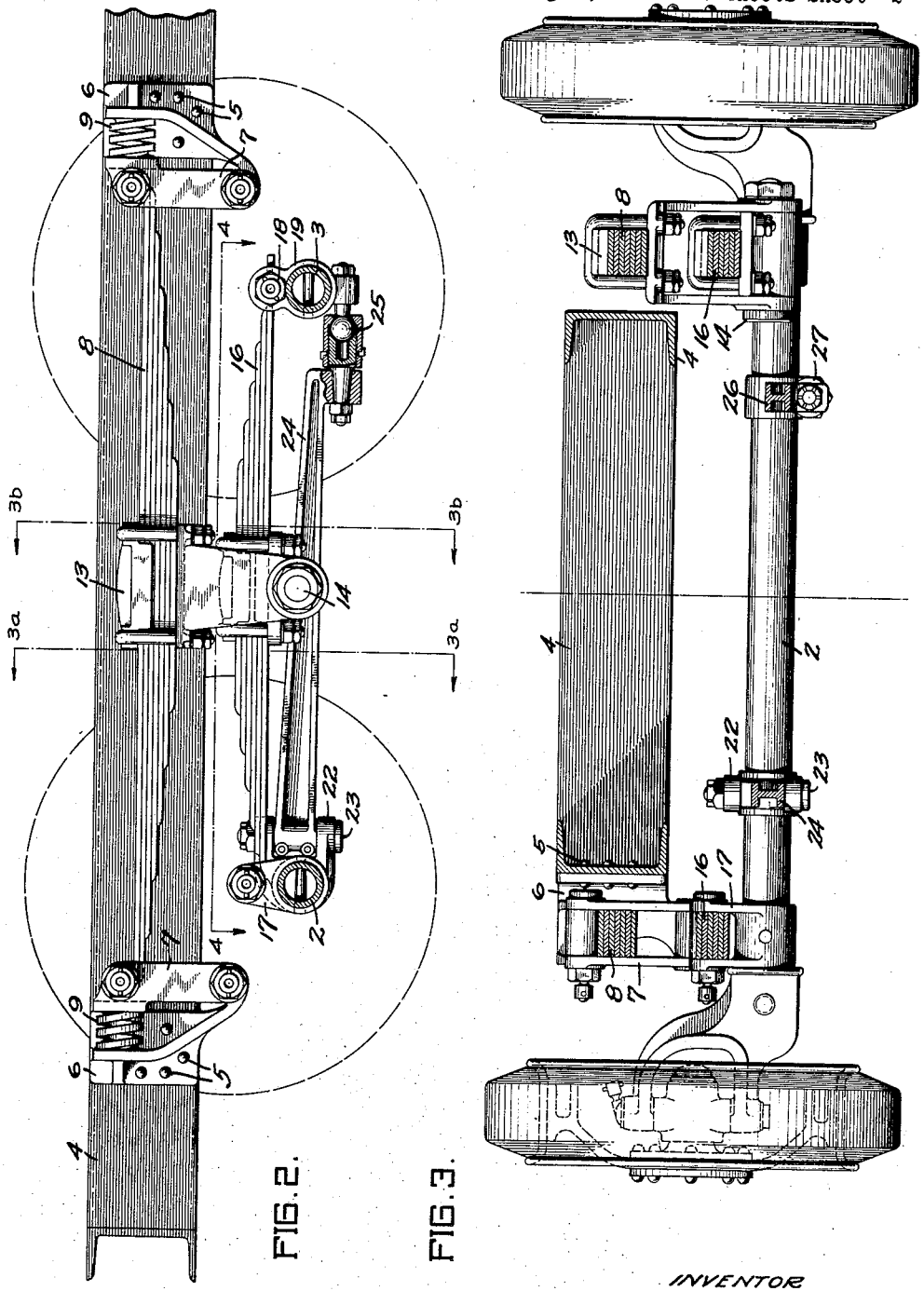

May 31, 1932. A. I. MARCUM 1,860,470
ROAD VEHICLE SPRING SUSPENSION
Original Filed Aug. 4, 1923  3 Sheets-Sheet 3
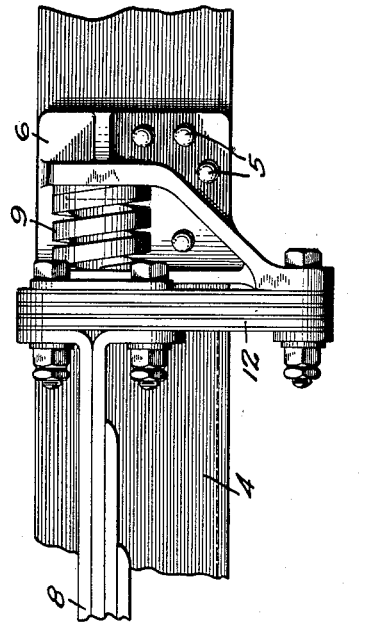
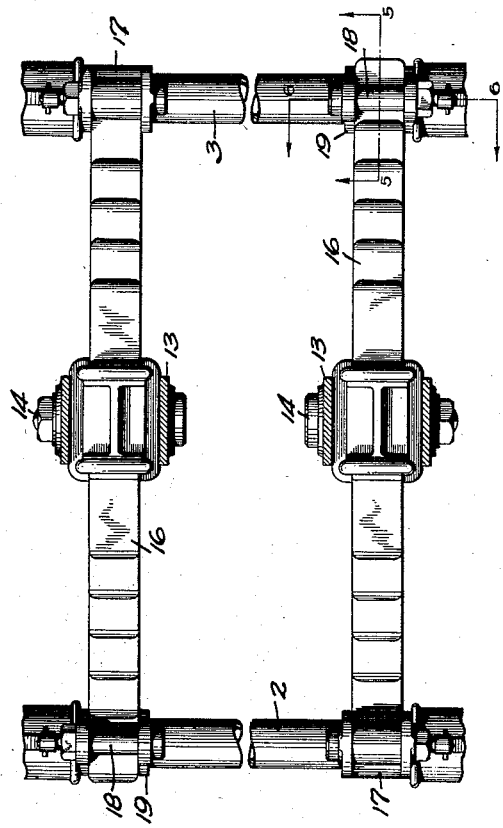
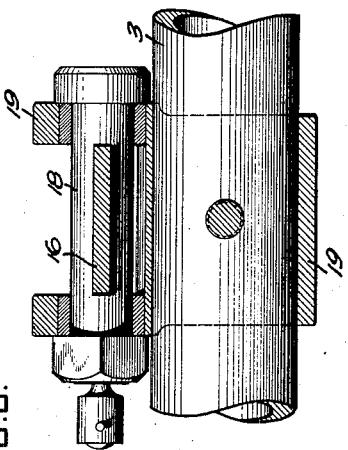
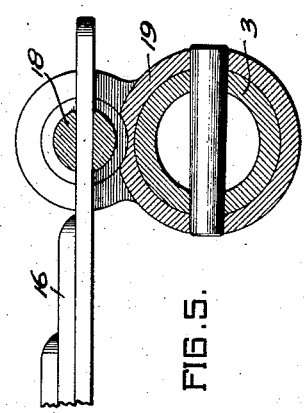
WITNESS:
H. Sherburne
INVENTOR
A. I. Marcum
BY White Frost Evans
his ATTORNEYS.

Patented May 31, 1932

1,860,470

UNITED STATES PATENT OFFICE

ARTHUR I. MARCUM, OF OAKLAND, CALIFORNIA, ASSIGNOR, BY MESNE ASSIGNMENTS, TO AUTOMOTIVE ENGINEERING CORPORATION, A CORPORATION OF DELAWARE

ROAD VEHICLE SPRING SUSPENSION

Application filed August 4, 1923, Serial No. 655,693. Renewed October 17, 1931.

The invention relates to a spring suspension for tandem axles.

An object of the invention is to provide a spring suspension for tandem axles which will produce very easy riding qualities of the vehicle.

Another object of the invention is to provide a spring suspension for tandem axles by virtue of which one axle is permitted to move vertically, as the vehicle passes along the road, without transmitting the shock to the other axle.

A further object of the invention is to provide a spring suspension for tandem axles which does not produce a variation in the spacing of the axles, due to spring flexure.

The invention possesses other advantageous features, some of which with the foregoing, will be set forth at length in the following description, where I shall outline in full that form of my invention which I have selected for illustration in the drawings accompanying and forming part of the present specification. In said drawings I have shown one form of my invention, but it is to be understood that I do not limit myself to such form, since the invention, as set forth in the claims, may be embodied in a plurality of forms.

Referring to said drawings:—

Fig. 2 is a vertical section of the front end of the vehicle taken on the line 2—2 Fig. 1.

Fig. 3 is a transverse section taken on the line 3—3 Fig. 1. The left half of the figure being taken on the line 3A—3A Fig. 2 and the right half being a section taken on line 3B—3B Fig. 2.

Fig. 4 is a section taken on the line 4—4 Fig. 2, parts of the figure being broken away to reduce the size of the figure.

Fig. 5 is a detail, showing connection between the spring and one of the axles.

Fig. 6 is a section through this same connection, taken at right angles to the section shown in Fig. 5.

Fig. 7 is a detail showing a modified form of spring shackle.

Figure 1:
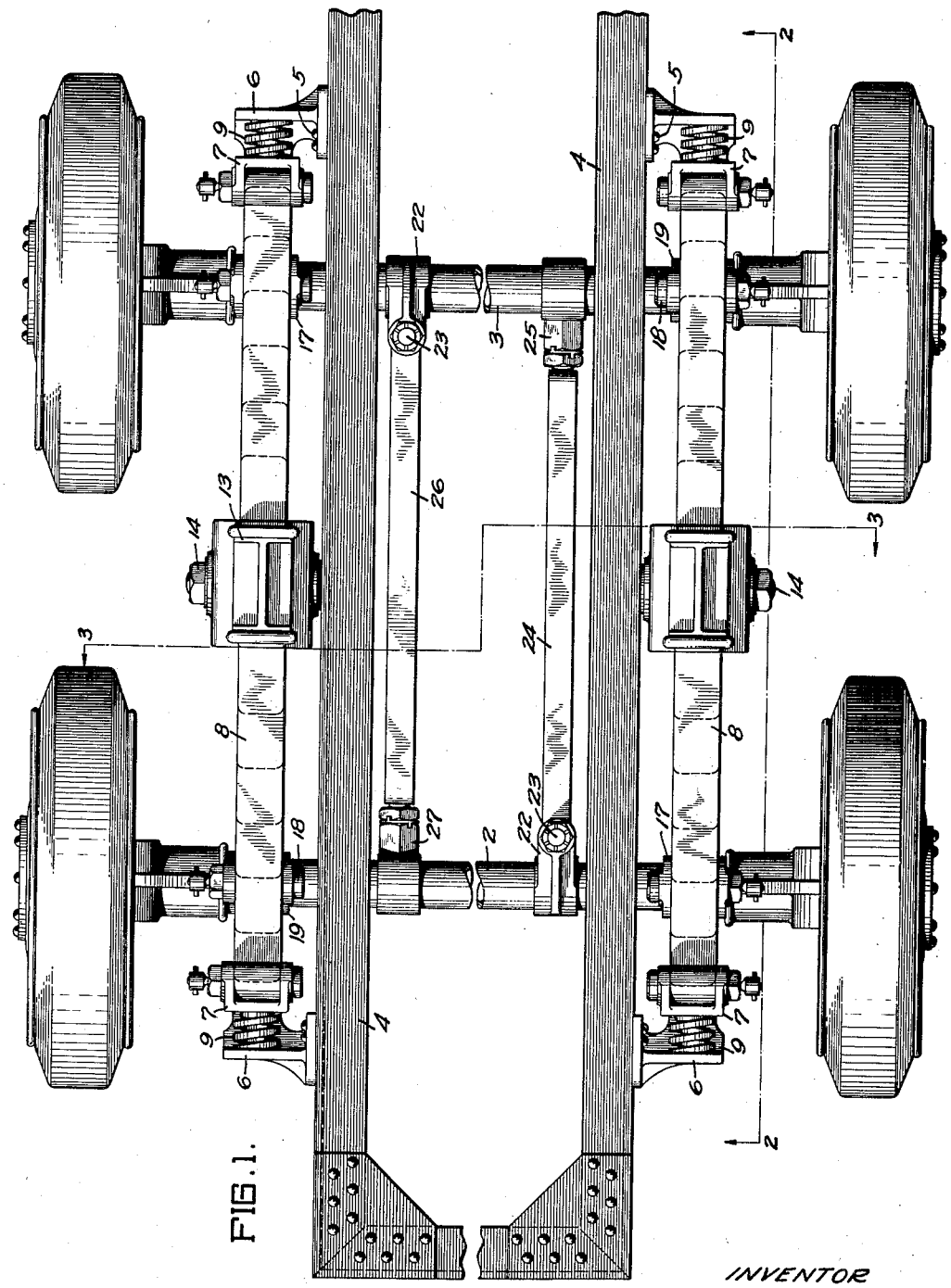
Fig. 1 is a plan view of a vehicle frame provided with the spring suspension of my invention, parts thereof being broken away to reduce the size of the figure.

The spring suspension of my invention is designed to be used with tandem axles, that is, a pair of parallel axles which are connected together as a unit. This pair of axles may be the front or steering axles, as shown in Fig. 1, or it may be the rear or driving axles. The front suspension of my invention comprises two superimposed leaf springs arranged on each side of the vehicle between the axles and in Fig. 2 these springs are shown in the position that they assume when the vehicle is fully loaded. The tandem axle comprises the two load carrying axles 2—3 and the spring suspension connects these axles together and to the vehicle frame 4.

Arranged on either side of the vehicle frame 4 and rigidly secured thereto by rivets 5 are spaced brackets 6, which preferably lie on the outside of the vehicle frame. These brackets preferably depend from the vehicle frame and pivoted thereto at their lower ends, are spring shackles or links 7, to which the ends of the long leaf spring 8 are pivoted. The long leaf spring 8 is thus shackled at both ends to the vehicle frame. The flexure of this spring is somewhat cushioned by means of heavy coiled springs 9 interposed between the upper part of the bracket 6 and the upper part of the shackles 7. The shackles 7 preferably comprise metal links, but when desired strips of fabric 12, to which the ends of the leaf springs are bolted, may be substituted for the metal links. The use of fabric eliminates the necessity of bearings at the upper and lower ends of the shackle and in many ways produces a construction which has features of advantage over the use of metal links, although at the present time I prefer to use the metal links.

Secured to the leaf spring 8 at its center is a bracket 13 which depends below the spring 8 and which is provided at its lower end with a stub-shaft or trunnion 14. Journaled on the stub-shaft is a box 15 which is clamped to the leaf spring 16 at its center, so that the leaf spring 16 is free to oscillate on the bracket 13 or is free to oscillate with respect to the spring 8. The stub-shaft or trunnion 14 is positioned midway between the two axles 2—3 and is parallel thereto and the axis of the stub-shaft and the axes of the two axles, preferably lie in the same horizontal plane when the vehicle is fully loaded. The spring 16 is positioned below the spring 8 and is preferably shorter than the spring 8.

It is understood that the spring suspension comprised two springs 8, one arranged on each side of the vehicle frame and two springs 16, one arranged under each spring 8. The springs 16 are connected to the axles 2—3 in such manner, that variations in the flexure of the springs will not cause a variation in the spacing of the axles. The spring 16 on one side of the vehicle is pivoted to the axle 2 and is movably connected, preferably by a sliding joint, with the axle 3 and the spring 16 on the other side of the vehicle is pivoted to the axle 3 and is movably connected, preferably by a sliding joint with the axle 2. The pivotal connection with the axle is made between an eye on the end of the spring and a bracket 17 secured to the axle. The sliding connection between the spring and the axle is formed by a bolt 18 having a slot therein through which the end of the leaf spring extends. The bolt 18 is free to rotate in the bracket 19 which is secured to the axle, so that flexure of the spring does not cause the end of the spring leaf to bind in the bolt. This construction permits the two axles to move vertically respectively without causing a variation in the spacing of the axle and without causing binding of the leaves of the spring 16. The bracket 17 is rigidly secured to the axle and extends above the axle and the bracket 19 in which the bolt 18 is journaled is also rigidly secured to the axle and extends above the axle.

Means are provided for preventing lateral displacement of the axles, while at the same time permitting them to have free relative movement in vertical planes. This means also serves to prevent rotation of the axles, a condition which would throw steering axles and pins out of alignment. Secured to the axle 2 at one side is a bracket 22 in which is pivotally mounted, on the vertical pin 23, a torque bar 24 which is connected at its other end to the axle 3 by the universal joint 25. On the other side of the vehicle the axle 3 is provided with a bracket 22 on which the torque bar 26 is connected by a vertical pivot and the other end of the torque bar 26 is connected to the axle 2 by a universal joint 27. Thus the axle 2 is prevented from rotating by the torque bar 24 and the axle 3 is prevented from rotating by the torque bar 26. These bars however, due to the presence of the universal joint, do not interfere with the relative movement of the axles in the vertical plane.

This construction produces a spring suspension of great flexibility in which the major portion of the shocks are absorbed by the springs and a very small portion of the shock transmitted to the vehicle frame. By virtue of the pivotal mounting of the springs 16 at its center, this spring is free to oscillate to absorb and minimize the shock and the long spring 8 absorbs the reduced shock so that very little movement or shock is transmitted to the vehicle frame.

I claim:—

1. A vehicle including tandem axles directly connected together in definite spaced relation by flexible connections that permit relative movement in substantially vertical planes, a leaf spring supported from said axles and connected thereto so as to permit endwise movement of a spring end relative to the axles, a second leaf spring pivotally connected to said first named leaf spring, means to swingingly secure the ends of said second leaf spring to the vehicle frame, and means to yieldingly resist the swinging movement of said last named means.

2. A vehicle including tandem axles, substantially parallel torque arms between said axles holding them in definite spaced relation, said arms being flexible in directions to permit relative movement of the axles in substantially vertical planes, a frame, a spring secured to said frame by connections that yieldingly resist endwise movement of the frame relative to the spring, a second spring secured to said axles in a manner to permit deflection of the spring without substantial separation of the axles, and means connecting said springs intermediate their ends.

3. A vehicle including tandem axles, torque arms between said axles holding them in definite spaced relation, each of said torque arms being pivoted at one end to one axle and being connected to said other axle by a universal joint whereby relative vertical movement between the axles is permitted, a frame, a spring secured to said frame by connections that yieldingly resist endwise movement of the frame relative to the spring, a second spring extending normally substantially parallel to said first named spring, said second spring being secured to said axles in a manner to permit deflection of the spring without substantial separation of the axles, and means connecting said springs intermediate their ends.

4. A road vehicle comprising a frame, a pair of wheel supported axles arranged adjacent one end of said frame, said axles being secured in definite spaced relation by a set of parallel flexible arms that permit each axle to tilt relative to the other axle, springs bridging the space between said axles and secured at their ends to said axles so that the springs are free to deflect, frame supported springs arranged over said axle supported springs and attached to said frame at their ends by means including cushioning elements that restrict and cushion the movement of the frame endwise of said last named springs said frame supported springs carrying trunnions secured thereto between their ends, said trunnions being arranged so that the axes thereof lie substantially in the horizontal plane containing the axes of the axles, said first named springs being connected to said trunnions between the spring ends.

5. A vehicle including tandem axles normally held in parallel relation by a pair of torque arms that are flexible in directions permitting relative tilting movement of the axles in substantially vertical planes, a frame, a leaf spring assembly yieldably secured at its ends to said frame, a bracket secured to a mid portion of said leaf spring assembly and provided with a trunnion arranged with its axis substantially in the horizontal plane containing the axes of the axles, a second leaf spring assembly secured to said bracket and mounted for movement about said trunnions axis, said second leaf spring assembly being secured to said axles independently of said torque arms by connections that permit the deflection of said second leaf spring assembly.

6. A vehicle including tandem axles normally held in parallel relation by torque arms spaced apart widely transversely of the vehicle, each of said torque arms being pivoted at one end to one axle to swing on a vertical axis and being connected to the other axle by a universal joint, a frame a leaf spring assembly secured at its ends to said frame in a manner permitting movement of the spring ends with respect to said frame as said spring deflects, a bracket secured to the mid portion of said leaf spring assembly, a trunnion carried by said bracket, said trunnion having its axes disposed substantially in the horizontal plane containing the axes of the axles, a second leaf spring assembly disposed beneath and in substantial parallelism with said first mentioned leaf spring assembly and mounted for movement about said trunnion axis, the ends of said second leaf spring assembly being attached to said axles independently of said torque arms by connections that permit the deflection of said second mentioned leaf spring assembly.

In testimony whereof, I have hereunto set my hand.

ARTHUR I. MARCUM.